United States Patent
Kato

(10) Patent No.: US 6,836,312 B2
(45) Date of Patent: Dec. 28, 2004

(54) OPTICALLY TRANSPARENT FILM, METHOD OF MANUFACTURING OPTICALLY TRANSPARENT FILM, ALIGNMENT FILM, AND LIQUID CRYSTAL PANEL AND DISPLAY INCLUDING ALIGNMENT FILM

(75) Inventor: Yoshimine Kato, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/236,753

(22) Filed: Sep. 6, 2002

(65) Prior Publication Data

US 2003/0063252 A1 Apr. 3, 2003

(30) Foreign Application Priority Data

Sep. 18, 2001 (JP) ........................................ 2001-283259

(51) Int. Cl.⁷ .......................... G02F 1/13; G02F 1/1337
(52) U.S. Cl. ........................................ 349/187; 349/123
(58) Field of Search .............................. 349/123, 187, 349/117, 190

(56) References Cited

U.S. PATENT DOCUMENTS

| | | | |
|---|---|---|---|
| 5,392,156 A | * | 2/1995 | Kumagai et al. ............ 359/586 |
| 5,397,920 A | * | 3/1995 | Tran ........................... 257/749 |
| 5,462,784 A | * | 10/1995 | Grill et al. ................... 428/65.5 |
| 5,518,783 A | * | 5/1996 | Kawata et al. ............... 428/1.1 |
| 5,612,450 A | * | 3/1997 | Mizushima et al. ......... 528/353 |
| 5,770,826 A | * | 6/1998 | Chaudhari et al. ..... 204/157.15 |
| 6,335,086 B1 | * | 1/2002 | Veerasamy ................... 428/217 |
| 6,355,902 B2 | * | 3/2002 | Akahori et al. ......... 219/121.43 |
| 6,572,937 B2 | * | 6/2003 | Hakovirta et al. ........... 427/577 |

FOREIGN PATENT DOCUMENTS

| | | | |
|---|---|---|---|
| JP | 04-204827 | 10/1977 | |
| JP | 52042388 | * 10/1977 | ............. G02F/1/13 |
| JP | 52-042388 | 7/1992 | |

* cited by examiner

Primary Examiner—Robert H. Kim
Assistant Examiner—Jeanne Andrea Di Grazio
(74) Attorney, Agent, or Firm—Schmeiser, Olsen & Watts; William H. Steinberg

(57) ABSTRACT

To provide an optically transparent film, a method of manufacturing the optically transparent film, an alignment film formed of the optically transparent film, and a liquid crystal panel and a display including the alignment film. The optically transparent film includes amorphous fluorocarbon. Preferably, the integrated transmittance of the optically transparent film is in the visible region is about 50% or higher when the optically transparent film has a film thickness of about 100 nm. The amorphous fluorocarbon has an atomic ratio between hydrogen atoms and fluorine atoms of about 1/9 or higher, and the transmittance in the visible region can be controlled by controlling the atomic ratio of fluorine atoms.

23 Claims, 5 Drawing Sheets

OPTICALLY TRANSPARENT FILM, METHOD OF MANUFACTURING OPTICALLY TRANSPARENT FILM, ALIGNMENT FILM, AND LIQUID CRYSTAL PANEL AND DISPLAY INCLUDING ALIGNMENT FILM

BACKGROUND OF THE INVENTION

The present invention relates to an optically transparent film which transmits visible light, and more particularly to an optically transparent film containing amorphous fluorocarbon, a method of manufacturing the same, an alignment film including the optically transparent film, and a liquid crystal panel and a display device using the alignment film.

Display devices, liquid crystal display devices in particular, have been widely used in recent years, and the scope of their application is increasing. A liquid crystal display device can be configured in the following manner: an electrode is formed of a transparent electrode material such as ITO (Indium Tin Oxide) on each of opposite transparent substrates made, in general, of glass, a liquid crystal material is filled into a gap between the substrates each having the electrode formed thereon, and the liquid crystal material is sealed in between the substrates by means of a sealing material. An alignment film generally made of a material such as a polyimide film or a carbon film is formed on a surface, facing the liquid crystal material, of the electrode formed on each substrate, and the alignment film is adapted to align the liquid crystal near the substrate so as to impart necessary optical properties to the liquid crystal.

A description will now be given with regard to the manufacture of the above-mentioned alignment film. When an organic film such as polyimide is used for manufacturing the alignment film, a polyimide precursor such as polyamic acid is coated on a transparent electrode. The polyamic acid undergoes pre-baking and further undergoes post-baking to transform the polyamic acid into a polyimide film. The polyimide film formed in this manner is not adequate to align liquid crystal, and therefore, rubbing takes place to subject the polyimide film to the process for aligning the liquid crystal.

On the other hand, when an inorganic material such as a carbon film is used to form the alignment film, the carbon film is formed on a transparent electrode by a method such as vapor deposition, CVD (chemical vapor deposition) or sputtering, and thereafter the carbon film is subjected to an alignment process by irradiation with a particle beam such as an ion beam, an atomic beam or a molecular beam in order to impart sufficient alignment to the carbon film. Although the above-described processes allows conventional alignment films to provide sufficient properties, a hydrogenated amorphous carbon film is often useful as the carbon film, that is, a so-called a-C:H film, for example. An a-C:H film can have a relatively low transmittance in the visible light range. To apply the a-C:H film to an optically transparent film which transmits visible light, the film thickness thereof must be therefore minimized to be about 10 nm or less, and this results in considerable limitations during the deposition process.

In addition, the relative dielectric constant of the a-C:H film is from about 4.8 to about 6.1 inclusive in the frequency range of 100 Hz to 10 kHz, which is obtained by actual measurement on the a-C:H film having a film thickness of about 300 nanometers (nm), and the relative dielectric constant thereof is known to lie in the range of about 4.5 to 6.5 even after allowing for the conditions of measurement and the properties of samples. An a-C:H film can have a dielectric constant largely different from the dielectric constant of the layer being located adjacent to the a-C:H film. Therefore, an electric charge can be stored on the interface between the a-C:H film and the adjacent layer, and the stored charge results in so-called space charge, which consequently forms a potential barrier.

When the above-mentioned space charge is accumulated, for example, in a liquid crystal display device, an electric field in the liquid crystal remains even after the removal of the driving electric field, and this causes electrical or electronic trouble in particular, such as a trouble that image-sticking is perceptible due to the remaining electric field. An optically transparent film, which is sufficiently optically transparent, has a low dielectric constant and can be easily manufactured, has been heretofore required.

Various attempts have been heretofore made to solve the above-mentioned problems. For example, a coating film including a thin coating film made of graphite fluoride is disclosed in Examined Japanese Patent Application Publication No. Sho (1977)52-42388. The graphite fluoride coating film is provided with crystal structures so as to be used as the alignment film of the liquid crystal display device. Although the coating film of graphite fluoride formed in this manner exhibits excellent properties to function as the alignment film, the coating film has low transmittance in visible light because the coating film is crystallized. Thus, the coating film must be formed with a thickness of less than about 10 nm in order to impart sufficient optical properties to the coating film, and this results in strict limitations on the manufacturing process.

Moreover, a coating film made of pitch fluoride is applied to the alignment film for use in the liquid crystal display device in Unexamined Japanese Patent Application Publication No. Hei 4(1991)-204827. Although a coating film of pitch fluoride is adequate to align liquid crystal molecules, the coating film has poor optical properties because it includes crystal structures, and thus the coating film is strictly limited in the manufacturing process in the same manner as the conventional a-C:H film. Therefore, the coating film of the pitch fluoride disclosed in Unexamined Japanese Patent Application Publication No. Hei 4(1991)-204827 has the disadvantage of increasing the costs of the manufacturing process, although the coating film of pitch fluoride has the advantage of reducing material costs.

The present invention is directed at overcoming the problems set forth above.

SUMMARY OF THE INVENTION

It is an object of the present invention to provide optically transparent film and a method of making the film having sufficient optical transparency and a low dielectric constant that can be easily manufactured.

It is another object of the present invention to provide an alignment film for aligning a liquid crystal material, which is formed from the optically transparent film of the present invention.

It is still another object of the present invention to provide a liquid crystal panel and a display device, which use the alignment film formed from the above-mentioned optically transparent film.

According to one aspect of the invention, there is provided an optically transparent film comprising an amorphous fluorocarbon compound.

According to another aspect of the invention, there is provided a method of manufacturing an optically transparent film, the method comprising the steps of providing a substrate, exposing the substrate to an atmosphere containing carbon to form the optically transparent film having an integrated transmittance on the substrate, and exposing the substrate to an atmosphere containing hydrogen and fluorine to include fluorine in the optically transparent film to the extent that the content of fluorine in the optically transparent film controls the integrated transmittance of the optically transparent film within the visible region.

According to yet another aspect of the invention, there is provided a panel comprising a first substrate having an external surface, a first optically transparent film including an amorphous fluorocarbon compound positioned on the external surface of the first substrate, and a liquid crystal layer positioned on the first optically transparent film.

For a more complete understanding of the present invention and the advantages thereof, reference is now made to the following description taken in conjunction with the accompanying drawings.

DETAILED DESCRIPTION OF THE PREFERRED EMBODIMENT

Figure 1:
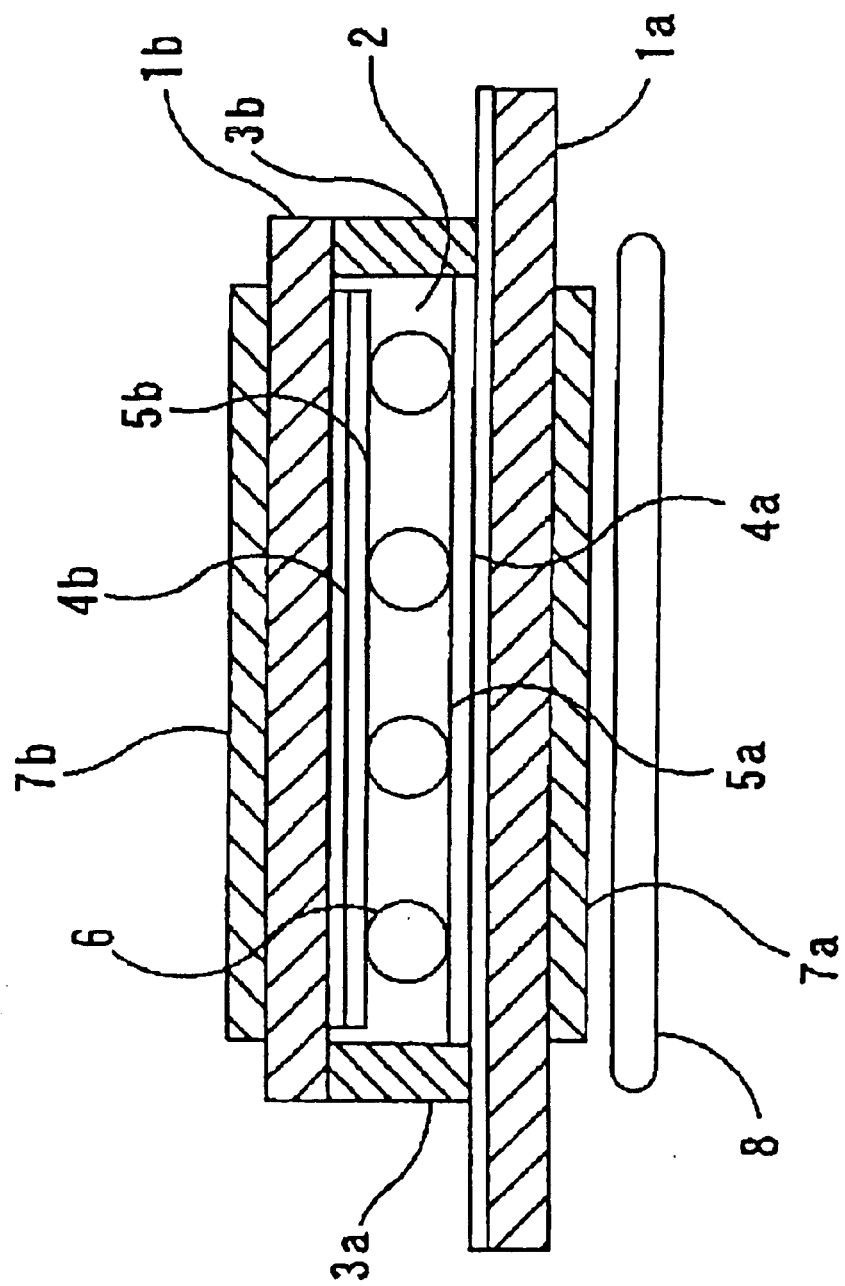
FIG. 1 is a schematic cross-sectional view in elevation of a part of a liquid crystal panel of the present invention.

The present invention will be described below with reference to an embodiment appropriately shown in the drawings, but the present invention is not limited to that embodiment.

Preferably, the optically transparent film of the present invention contains amorphous fluorocarbon as a main component. More preferably, an amorphous hydrogenated fluorocarbon film (a-C:F:H), which contains carbon deposited by a method such as sputtering or vacuum deposition in the presence of a carbon source, a hydrogen source and a fluorine source, is used. In the present invention, "amorphous" means not only optical properties of a material of the optically transparent film in optical terms, but also that an optical effect of scattering or absorption is not caused by a crystal portion of the material.

Various materials can be selected as the above-mentioned carbon source. For example, the materials can include high-purity carbon sources such as graphite and diamond. In the present invention, the use of a high-purity carbon source allows an improvement in amorphous properties of the optically transparent film, and thus makes it possible to provide an optically transparent film having excellent amorphous properties throughout a wide area. Materials having various shapes can be used as the above-mentioned carbon source, but preferably, a material having a shape suitable for use in the process of sputtering or vacuum deposition, such as a carbon target, is used.

In the present invention, the hydrogen source, which can be used for the deposition in conjunction with the carbon source, is in the form of a hydrogen gas source. The hydrogen sources include, but are not limited to, for example, hydrocarbon compounds expressed by general formulas $C_nH_{2n+2}$, $C_nH_{2n}$ and $C_nH_{2n-2}$, such as hydrogen ($H_2$), methane, ethane, propane, butane, ethylene, propene, butene and acetylene (where n denotes any natural number equal to or more than 1).

In the present invention, the available fluorine source is provided in the form of a gaseous fluorine-containing compound. The fluorine sources suitable for the present invention include a perfluorocarbon group in which general formulas such as $CF_4$, $C_2F_6$, $C_3F_8$, $C_2F_4$ and $C_3F_6$ are expressed as $C_nF_{2n+2}$, $C_nF_{2n}$ and $C_nF_{2n-2}$.

In the present invention, a hydrofluorocarbon group expressed by $C_nH_mF_{2n+2-m}$, $C_nH_mF_{2n-m}$ or $C_nH_mF_{2n-2-m}$ may be used as a compound which functions as not only the hydrogen source but also the fluorine source (where m and n denote any natural number equal to or more than 1).

The optically transparent film of the present invention provides integrated transmittance of about 50% or higher for light in the visible region, when the optically transparent film has a film thickness of about 100 nm. Lower integrated transmittance than about 50% may cause deterioration in optical properties of an optical element to which the optically transparent film is applied, when the film is used as a coating film for the optical element. In a specific embodiment such as the case for which optical transparency in particular is desired, it is preferable that the integrated transmittance of the optically transparent film of the present invention be about 88% or higher when the film thickness is equal to about 10 nm. Moreover, when a higher degree of optical transparency is desired, the integrated transmittance of the optically transparent film about 10 nm thick can be increased to about 99% or higher by increasing the ratio of fluorine atoms in the optically transparent film of the present invention.

Although the film thickness of the optically transparent film of the present invention is not particularly limited, the film thickness may lie in the range of about 0.5 nm to about 500 nm from the viewpoint of the manufacturing process. The film thickness may lie in the range of about 0.5 nm to about 200 nm in order to prevent deterioration in optical properties in the visible region for optical applications in particular, or preferably, film thickness between about 0.5 nm and about 100 nm imparts excellent optical properties to the optically transparent film.

Preferably, the relative dielectric constant of the optically transparent film of the present invention is approximately equal to the relative dielectric constant of such as a glass substrate or another layer adjacent to the optically transparent film, when the optically transparent film is used as an alignment film for a liquid crystal cell to be described later, for example. As previously described, when there is too large a difference between the relative dielectric constant of the optically transparent film and the relative dielectric constant of the adjacent film or layer, space charge caused by charge retention at the interface between the optically transparent film and the adjacent film or layer is stored, and this can cause an undesired phenomenon on electrical properties.

In the present invention, the relative dielectric constant of the optically transparent film preferably lies in the range of about 2 to about 5 or more preferably lies in the range of about about 2 to about 4 from the above-mentioned viewpoint of electrical properties and the viewpoint of optical properties such as a refractive index, although the relative dielectric constant may vary according to the conditions of measurement, the conditions of samples and so forth.

Preferably, the ratio between H atoms and F atoms (H/F), which form an amorphous hydrogenated fluorocarbon film, for instance, is about 1/9 or higher in terms of atomic ratio and yields an optically transparent film having the above-mentioned relative dielectric constant. When the ratio of H atoms to F atoms is lower than about 1/9, amorphous properties can deteriorate, the film can be prone to have crystal structures, and moreover, productivity such as a deposition rate can deteriorate. Transmittance of light in the visible region can be adjusted over a wide range by increasing the ratio of content of fluorine atoms in the optically transparent film. The present invention allows optically transparent film having a film thickness of about 100 nm to be adjusted so that the integrated transmittance is in the range of about 50% or higher without having a large influence on other properties.

To manufacture the optically transparent film of the present invention, the above-described hydrogen source and fluorine source of the present invention are introduced into a vacuum container by a carrier gas formed of an appropriate inert gas, and the film is deposited on a substrate such as glass by an appropriate deposition method such as sputtering such as magnetron sputtering, vacuum deposition or chemical vapor deposition.

The carrier gases available for the present invention includes, for example, rare gases such as He (helium), Ne (neon), Ar (argon), Kr (krypton) and Xe (xenon), and $N_2$ (a nitrogen gas), and an inert gas including a mixture of these gases. Surface properties of the optically transparent film of the present invention may be modified by imparting a predetermined surface state to the optically transparent film through the application of a particle beam formed of particles such as $Ne^+$, $Ar^+$, $Kr^+$ or $Xe^+$ to the formed optically transparent film. Any means capable of generating a particle beam known in the art, e.g., an ion beam may be used as a charged particle beam generating source available for this modification.

The more detailed description is given below of one embodiment of the present invention with regard to a liquid crystal cell and a display device in which the above-described optically transparent film is used as the alignment film. The optically transparent film is not limited to the liquid crystal and a display device and may be applied to a liquid crystal panel for IPS (in-plane-switching) liquid crystal display device or other liquid crystal panels having a similar function.

FIG. 1 is a cross-sectional view in elevation of a part of a liquid crystal panel of the present invention. The liquid crystal panel of the present invention shown in FIG. 1 is configured in the following manner. A liquid crystal material 2 is positioned in a space between glass substrates 1a and 1b facing each other to fill the space. Sealing material/sealant (hereinafter, referred as a sealing material) 3a and 3b is provided on both ends of glass substrates 1a and 1b so as to prevent leakage of liquid crystal material 2 from the space between the glass substrates forming a cell.

The glass substrates 1a and 1b can include alkali glass such as soda-lime glass, and no-alkali glass such as borosilicate glass, aluminoborosilicate glass, silica glass and sapphire glass. However, any glass substrate may be used in the present invention so long as it satisfies the following conditions: (1) being transparent, (2) being homogeneous and having no dependence on size, (3) having heat resistance, (4) being chemically stable, and (5) having appropriate electrical properties.

Any known sealing material can be used as the above-mentioned sealing materials 3a and 3b. A resin material may be used in this present invention as long as it provides appropriate properties. Some examples of resins that can be used in the present invention are thermosetting resins such as epoxy resins, and ultraviolet-curing resins.

The liquid crystal panel of FIG. 1 includes transparent electrodes 4a and 4b positioned on the respective surfaces, facing liquid crystal material 2, of glass substrates 1a and 1b. An electric field can be applied to liquid crystal material 2. Transparent electrodes 4a and 4b can be made of various materials, which may include metal, and metal oxides such as ITO, ATO, IZO, $SnO_2$ and $In_2O_3$. Preferably, ITO is used from the viewpoint of transparency and tinting. Transparent electrodes 4a and 4b can be formed by any process which yields the appropriate properties such as vacuum deposition, sputtering, CVD or DC magnetron sputtering.

Alignment films 5a and 5b are formed on the respective surfaces, facing the liquid crystal, of transparent electrodes 4a and 4b, respectively, in order to confine and align the liquid crystal. In the embodiment shown in FIG. 1, alignment films 5a and 5b are each made of an optically transparent film containing the hydrogenated fluorocarbon film, and are subjected to the process for alignment by an $Ar^+$ ion beam. Alignment films 5a and 5b can be formed by magnetron sputtering in an atmosphere of inert gas such as Ar.

Spacers 6 maintain the space between glass substrates 1a and 1b. Switching elements such as TFTs (not shown) are formed on glass substrate 1a of the liquid crystal panel. These switching elements are located between polarized sheets 7a and 7b, and thus, the liquid crystal panel is configured to function as a display device by light emitted from a backlight 8 and liquid crystal material 2 aligned by an electric field applied to glass substrates 1a and 1b. In the liquid crystal panel of the present invention, a color filter (not shown) may be used for color display.

Liquid crystal material 2 may include, for example, twisted nematic liquid crystal, super twisted nematic liquid crystal and cholesteric liquid crystal. Any of these liquid crystal materials may be combined with various chiral additives, dyes or the like into a composition so as to obtain desired properties.

Figure 2:
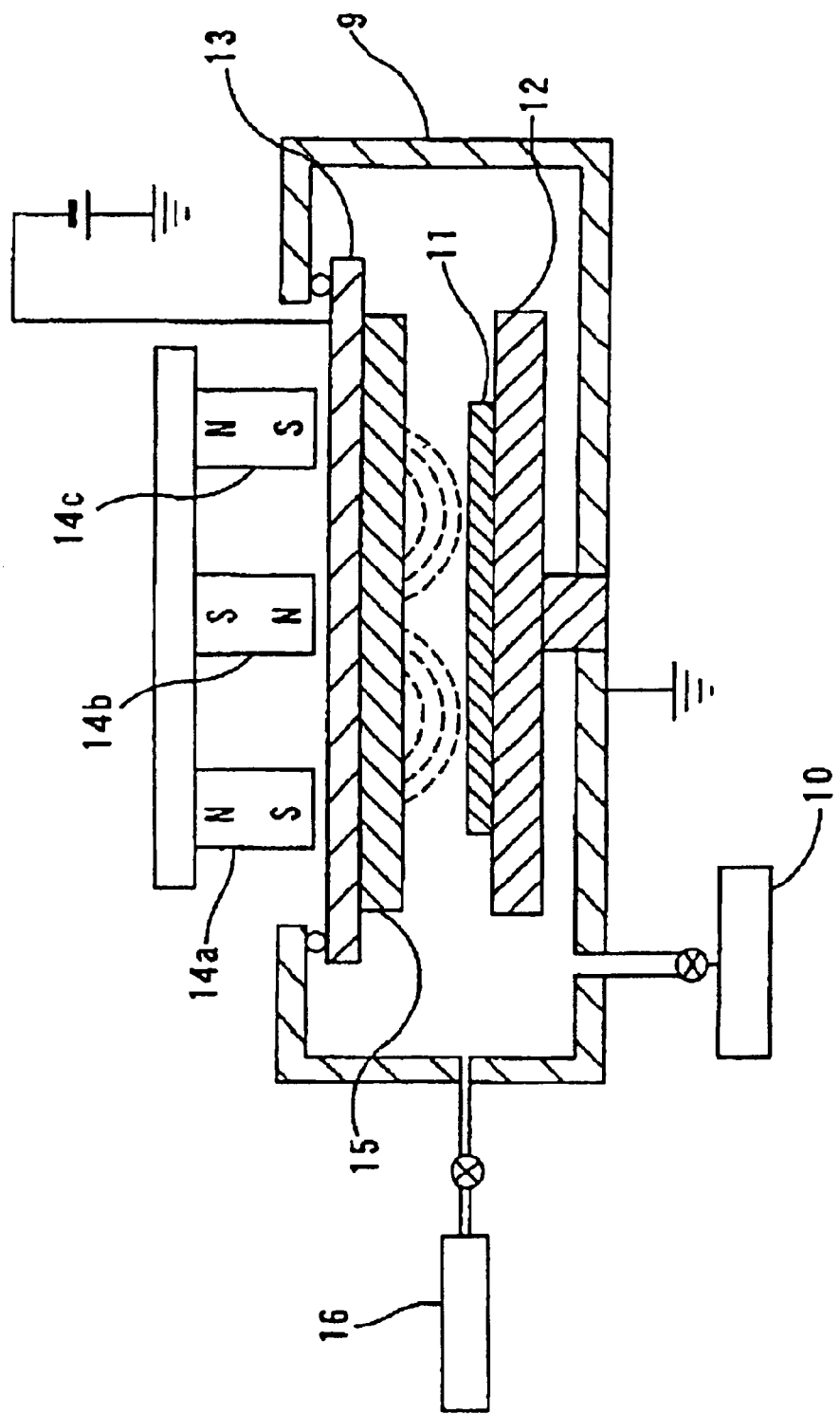
FIG. 2 is a view showing an apparatus for manufacturing an optically transparent film used as an alignment film in the liquid crystal panel of the present invention.

FIG. 2 shows an apparatus for manufacturing the optically transparent film used as the alignment film of the liquid crystal panel of the present invention. The apparatus includes a container 9 in which the deposition of the optically transparent film takes place, an exhauster or a vacuum pump 10 for evacuating the container, substrate holding means 12 for holding a substrate 11 on which the optically transparent film is to be deposited while moving the substrate, a backing plate 13, and magnets 14a, 14b and 14c located adjacent to and external to the container. Substrate holding means 12 may be provided with a heater (not shown) so as to improve the efficiency of deposition. Substrate holding means 12 may be rotated or translated so that the film can be uniformly deposited on substrate 11.

Backing plate 13 is insulated from container 9 by appropriate means. A power supply is connected to backing plate 13, and thus, the backing plate is configured to generate plasma by electrical discharge and thereby sputter a material of a target 15 attached to the backing plate. Target 15 can include a carbon target, and the carbon may have the structure of graphite, diamond, or a mixture of these materials. A gas source 16 for supplying a carrier gas including an appropriate inert gas, such as Ar, is connected to the apparatus.

The manufacturing apparatus also includes ion beam generating means (not shown) in order to use the optically transparent film of the present invention as the alignment film, and this means allows the apparatus to perform surface modification for imparting a predetermined alignment to liquid crystal material 2 of FIG. 1. Container 9 and substrate holding means 12 are grounded as shown in FIG. 2, but in the present invention, the substrate holding means, may not be grounded.

Magnets 14a, 14b and 14c are alternately arranged in such a manner that the magnetic poles of the adjacent magnets are opposite each other, and thus magnets 14a, 14b and 14c are configured to generate magnetic fields shown by the broken lines in FIG. 2 and thus form appropriate magnetron discharge plasma. A magnet having a magnetic flux density of about 0.01 T to about 0.2 T can be used with each of magnets 14a, 14b and 14c of the present invention. Considering ease of handling, stability of sputtering and so on, it is preferable that a magnet having a magnetic flux density of about 0.02 T to about 0.15 T be used, or a magnet having a magnetic flux density of about 0.025 T to about 0.1 T be used. Magnets 14a, 14b and 14c can be permanent magnets, or electromagnets.

A method of manufacturing the optically transparent film of the present invention by using magnetron sputtering will now be described. Referring to FIG. 2, substrate 11 is placed on substrate holding means 12 in container 9 of the manufacturing apparatus, then the container is made airtight, and thereafter exhauster 10 is started to evacuate the container. The appropriate carrier gas such as Ar, the hydrogen source and the fluorine source are supplied at an appropriate flow rate ratio to form a predetermined pressure in container 9. The ratio of the carrier gas to the hydrogen source plus the fluorine source, which is available for the present invention, can be adjusted to lie in the range of about 10:10 to about 99:1, or preferably, the ratio can lie in the range of about 10:10 to about 50:10 in view of productivity.

A current is supplied from the power supply to induce magnetron discharge and thus generate a C-element-containing active species from the carbon target located in container 9, and thus, the film is deposited on substrate 11 by a sputtering process.

An example of the magnetron sputtering conditions includes, for example, a sintered carbon target, Ar as the carrier gas, pressure in the range of about 0.5 Pa to about 2 Pa, and power in the range of about 1 kW to about 2 kW. Substrate holding means 12 may include reciprocating motion or translation in one direction, as described above, in order that the coating film may be uniformly deposited on substrate 11.

Figure 3:
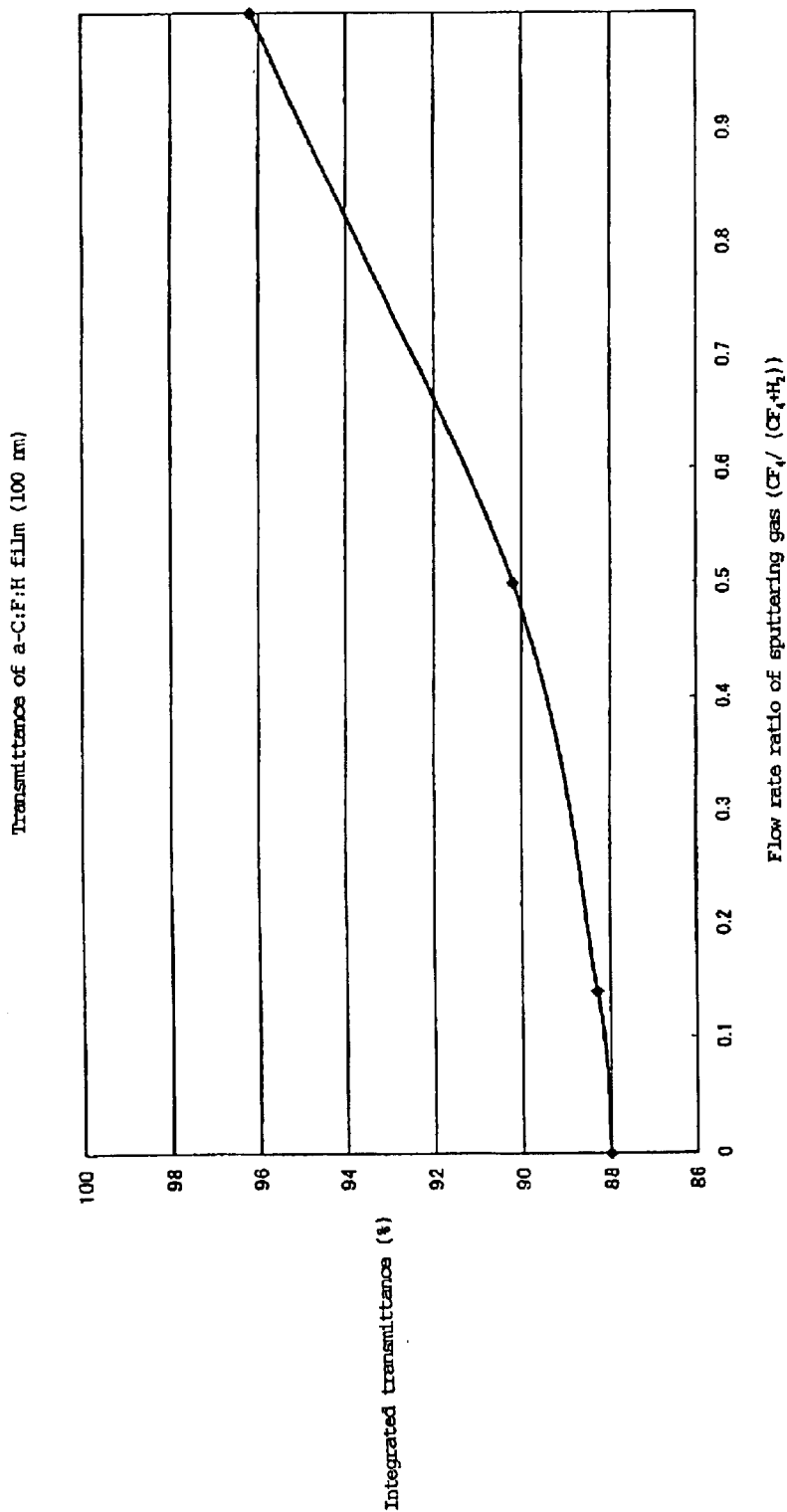
FIG. 3 is a graph of the flow rate ratio between a hydrogen source ($H_2$) and a fluorine source ($CF_4$) for magnetron sputtering in a process of manufacturing the optically transparent film of the present invention plotted against the integrated transmittance (%) of the optically transparent film having a film thickness of about 100 nm in the visible region.

FIG. 3 is a graph of the flow rate ratio between the hydrogen source ($H_2$) and the fluorine source ($CF_4$) for performing magnetron sputtering in the method of manufacturing the optically transparent film of the present invention plotted against the integrated transmittance (%) of the optically transparent film having a film thickness of about 100 nm in the visible region. Ar is used as the carrier gas, and the ratio of the carrier gas to the hydrogen source and the fluorine source, Ar:($H_2$+$CF_4$), can be set to about 30:10 in terms of the flow rate ratio. The abscissa axis indicates the flow rate ratio of $CF_4$ to ($H_2$+$CF_4$) for sputtering, and the ordinate axis indicates the integrated transmittance (%) in the visible region. From FIG. 3, it can be seen that an increase in the flow rate ratio of $CF_4$ to ($H_2$+$CF_4$) yields an increase in the integrated transmittance. In addition, it is found that, when the optically transparent film of the present invention is used as the alignment film of the liquid crystal panel, a reduction in surface energy caused by the introduction of fluorine atoms provides a vertical aligned film without performing a process such as irradiation with the ion beam.

FIG. 3 further shows that the flow rate ratio between $H_2$ and $CF_4$ in excess of approximately 0.40 yields a marked improvement in the integrated transmittance. The present invention can impart excellent optical properties and electrical properties to the optically transparent film by manufacturing the optically transparent film at a predetermined flow rate ratio of the fluorine source.

Figure 4:
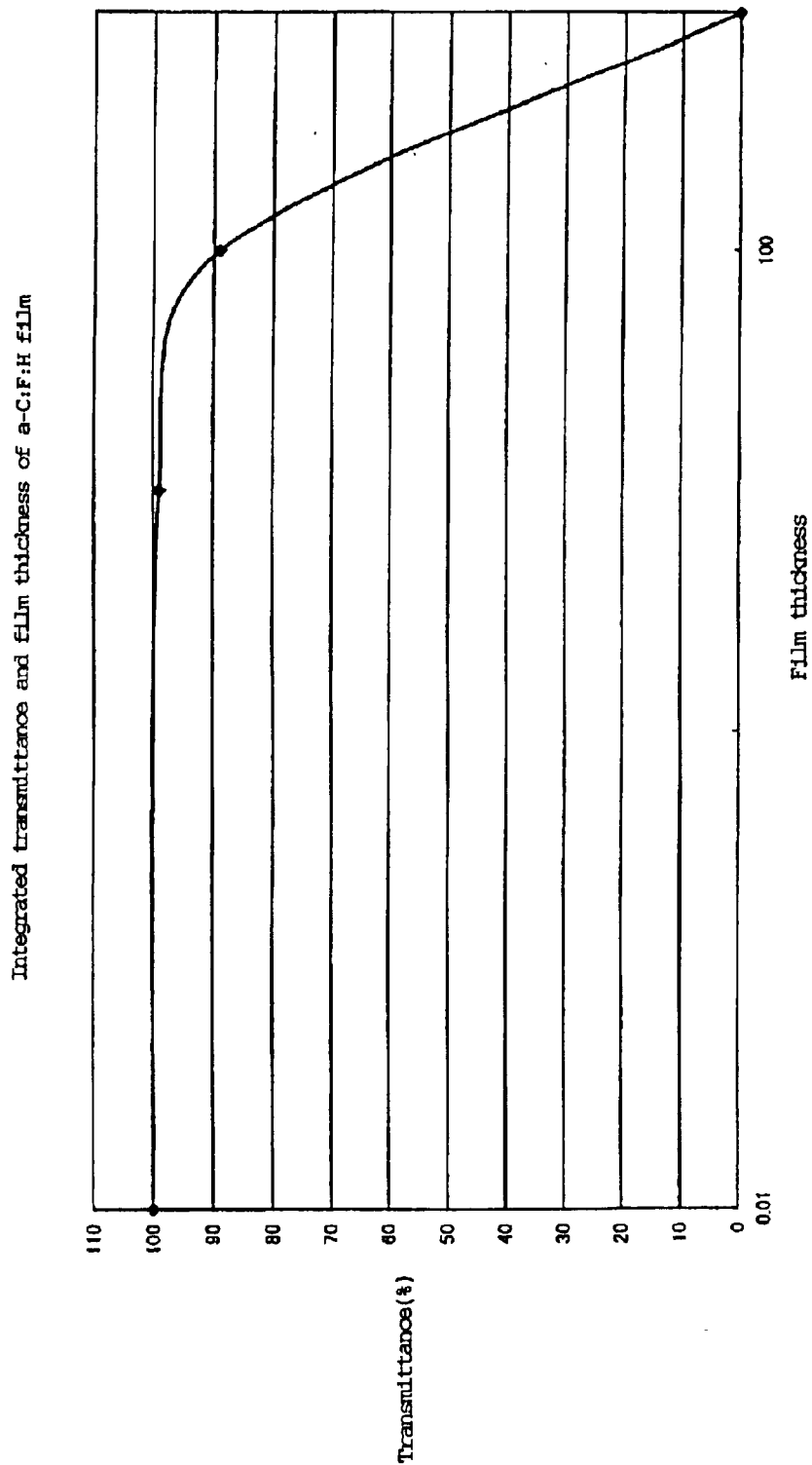
FIG. 4 is a graph of the film thickness of the optically transparent film of the present invention plotted against the integrated transmittance thereof.

FIG. 4 is a transmittance-thickness plot, which is obtained by plotting the integrated transmittance (%) of the optically transparent film manufactured under the manufacturing conditions described above versus the logarithm of the film thickness (nm) of the optically transparent film. The optically transparent film of the present invention has very flat transmittance-thickness properties, particularly in a region where the film thickness is about 100 nm or less. Also from FIG. 4, it can be therefore seen that the optically transparent film of the present invention has a very excellent margin of the film thickness.

Figure 5:
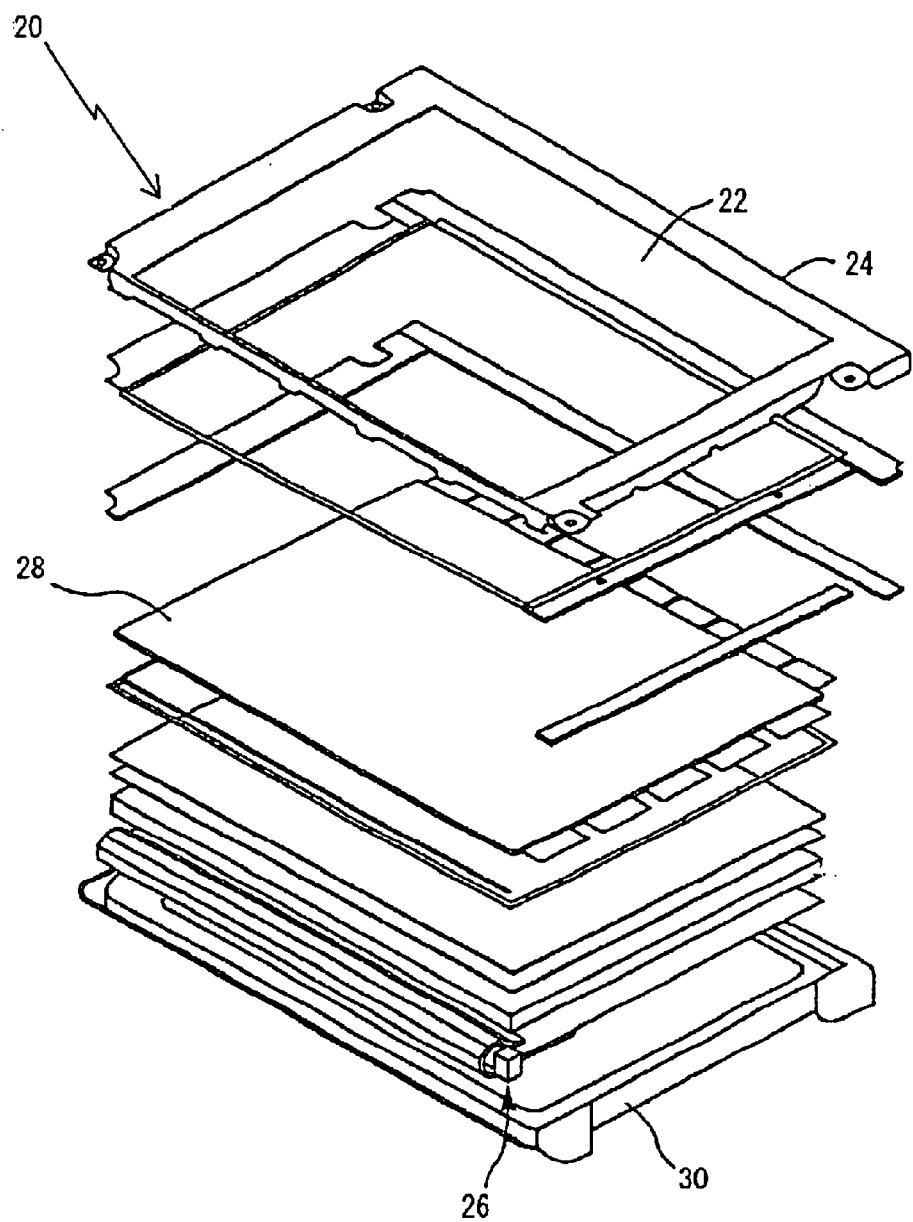
FIG. 5 is an exploded perspective view of a display device manufactured using the liquid crystal panel of the present invention.

FIG. 5 is an exploded perspective view of a display 20 manufactured using the liquid crystal panel of the present invention, with a transmission type liquid crystal display. As shown in FIG. 5, display device 20 of the present invention includes a top frame 24 for defining a display window 22. The display window 22 defines an effective area of display device 20. The display device includes a backlight unit 26 and a liquid crystal panel 28 located between top frame 24 and the backlight unit.

Backlight unit 26 is placed on a bottom case 30, and the backlight unit is integrally held with top frame 24 to constitute display 20. Backlight unit 26 shown in FIG. 5 efficiently emits light from a fluorescent tube or the like to liquid crystal panel 28, thereby making excellent display possible. Liquid crystal panel 28 includes a liquid crystal cell configured according to the present invention, and an active matrix array substrate configured to transmit an appropriate driving signal to the liquid crystal cell, and thus the liquid crystal panel enables liquid crystal display.

The liquid crystal panel 28 of the present invention includes the optically transparent film of the present invention, and therefore the liquid crystal panel permits providing a display device having uniform display quality, high luminance and a large screen. Moreover, the alignment film of display 20 of the present invention has about the same relative dielectric constant as the liquid crystal material, and therefore the display exhibits excellent properties of disappearance of image-sticking without storing space charge on the interface between the alignment film and the liquid crystal material.

Although the present invention will be described below by referring to specific examples, the present invention is not limited to the following examples.

An optically transparent film of the present invention having a film thickness of about 10 nm was deposited on a glass substrate by magnetron sputtering method under the following conditions using the manufacturing apparatus shown in FIG. 2.

Target: Sintered carbon target
Carrier: Ar, pressure of 1 Pa
Gas Flow rate: Ar:($H_2$+$CF_4$)=30:10 sccm
Discharge power: 1 kW
Distance between magnets: 6 cm
Distance between magnets and substrate: 5 cm
Magnetic flux density of magnet: 0.0250 T
Making of Liquid Crystal Panel and Display In the same manner as the example 1, the optically transparent film was formed on a glass substrate having a thin film transistor array formed thereon. The optically transparent film was subjected to surface treatment by irradiating its surface with an $Ar^+$ ion beam, and thus the alignment film was formed.

Another glass substrate having an opposite electrode formed thereon was located opposite to the surface of the glass substrate on which the alignment film was formed, and thus a cell having a cell thickness of about 5 mm was formed. Then, a twisted nematic liquid crystal material, MJ971189 (commercially available from Merck Ltd.) was injected into the cell and sealed in the cell, and thus the liquid crystal panel and the display device including the liquid crystal panel were manufactured.

Comparison 1

An a-C:H film of about 10 nm thick was deposited on a glass substrate by magnetron sputtering under the following conditions using the manufacturing apparatus shown in FIG. 2.

Target: Sintered carbon target
Carrier: Ar, pressure of 1 Pa
Gas flow rate: Ar:$H_2$=30:10 sccm
Discharge power: 1 kW
Distance between magnets: 6 cm
Distance between magnets and substrate: 5 cm
Magnetic flux density of magnet: 0.0250 T Comparison 2

The liquid crystal panel and the display device were manufactured in the same manner as the example 2, except that the a-C:H film manufactured in Comparison 1 was used as the alignment film as in the case of example 2.

Optical Properties and Electrical Properties

The integrated transmittance of the glass substrate, on which the optically transparent film obtained in example 1 was formed, was measured by using an ultraviolet and visible spectrophotometer having an integrating sphere attached thereto, and the measured value was about 99.2%.

The same measurement was made on the glass substrate on which the a-C:H film obtained in comparison 1 was formed, by using the same measuring apparatus. The measured value of the integrated transmittance was about 98.7%. A difference between the integrated transmittance values means that the alignment film using the optically transparent film of the present invention can have substantially the same integrated transmittance as the a-C:H film has, even if the film thickness of the alignment film is about 3 times that of the a-C:H film of comparison 1 (this is explained below in Table 1).

The optically transparent film having a film thickness of about 150 nm was formed under the conditions described above, and the relative dielectric constant thereof was measured. The relative dielectric constant was between about 2 and about 5 on average. The a-C:H film having a film thickness of about 150 nm was formed in the manner as described in the comparison case above, and the relative dielectric constant thereof was measured. The relative dielectric constant was between about 5.5 and about 6.5 on average.

Display Quality

A test of display quality was performed using the display device manufactured in example 2. A test of disappearance of image-sticking was adopted as the test of display quality because the image-sticking was considered to be directly affected by space charge. The test of disappearance of image-sticking was carried out in the following manner. An electric field was applied so that the part of liquid crystal panel might enter a bright state, the liquid crystal panel was kept in this state for 1 to 5 minutes, and then, visual observations were made to measure the average time elapsing between the time of removal of the electric field for driving liquid crystal and the time of disappearance of afterimage. The time required for the disappearance of image-sticking of the display manufactured in example 2 was 0 second. In other words, the test shows that the image-sticking was eliminated.

On the other hand, the test was performed on the display device manufactured in comparison 2 under the same conditions. The time required for the disappearance of image-sticking was 32.5 seconds on average. The image-sticking is generated due to the storage of space charge on the interface between the alignment film and the liquid crystal material. The liquid crystal panel and the display device using the alignment film of the present invention exhibited excellent display quality. Table 1 provides a summary of the obtained results.

TABLE 1

| | Example | Comparison |
|---|---|---|
| integrated transmittance (%) | 99.2 | 98.7 |
| relative dielectric constant | 2–5 | 5.5–6.5 |
| image sticking time (s)[1] | 0 | 32.5 |
| Margin of film thickness[1],[2] | x3 | x1 |

[1]Evaluation on display device
[2]This indicates the film thickness ratio with which the same integrated transmittance is provided, when the value of the comparison is set to 1.

As described above, the alignment film of the present invention facilitates control of the deposition process and thus allows a reduction in manufacturing costs. The alignment film also allows a further improvement in uniformity in the same deposition process and thus enables an improvement in display quality. Furthermore, the optically transparent film of the present invention has a low dielectric constant. Therefore, the optically transparent film allows a reduction in the occurrence of the space charge problem, thereby providing a display device having excellent display quality, high luminance and a large screen. In addition, when the optically transparent film of the present invention is used as the alignment film of the liquid crystal panel, a reduction in surface energy caused by the introduction of fluorine atoms allows the alignment film to be a vertically aligned without performing a process such as irradiation with the ion beam.

Although the present invention has been described above by taking as examples the embodiment and the detailed examples, the present invention is not limited to the above-described embodiment and examples. As the manufacturing method, the configuration of the cell and the detailed configuration of the display, any known method and configuration may be used. Although the optically transparent film of the present invention has been described by referring to the specific embodiment in which the optically transparent film is applied to the liquid crystal panel and the display, device the present invention can be applied for various optical applications such as surface coating of an optical element, as well as the above-mentioned liquid crystal panel and display.

Although the preferred embodiments of the present invention have been described in detail, it should be understood that various changes, substitutions and alternations can be made therein without departing from spirit and scope of the inventions as defined by the appended claims.

What is claimed is:

1. An optically transparent film comprising an amorphous fluorocarbon compound, wherein said amorphous fluorocarbon compound comprises an amorphous hydrogenerated fluorocarbon compound, wherein said optically transparent film has an integrated transmittance in the visible region of about 50% or higher.

2. The optically transparent film of claim 1, wherein said optically transparent film has a film thickness of between about 0.5 nm and about 100 nm.

3. The optically transparent film of claim 1, wherein said amorphous hydrogenated fluorocarbon compound includes hydrogen and fluorine in an atomic ratio of about one part hydrogen to about nine parts fluorine or higher.

4. The optically transparent film of claim 1, wherein said optically transparent film has a relative dielectric constant in the range of about 2 to about 5.

5. An optically transparent film comprising an amorphous fluorocarbon compound, wherein said amorphous fluorocarbon compound comprises an amorphous hydrogenated fluorocarbon compound, wherein said optically transparent film includes a liquid crystal layer thereon.

6. The optically transparent film of claim 5, wherein said liquid crystal layer is a particle beam aligned liquid crystal layer.

7. A method of manufacturing an optically transparent film, the method comprising the steps of:
   providing a substrate;
   exposing said substrate to an atmosphere containing carbon to form said optically transparent film having an integrated transmittance on said substrate; and
   exposing said substrate to an atmosphere containing hydrogen and fluorine to include fluorine in said optically transparent film to the extent that the content of fluorine in said optically transparent film controls said integrated transmittance of said optically transparent film within the visible region, wherein said exposing said substrate to said atmosphere containing hydrogen and fluorine further comprises the step of forming said optically transparent film including an amorphous hydrogenated fluorocarbon compound on said substrate.

8. The method of claim 7, wherein said forming said optically transparent film including said amorphous hydrogenated fluorocarbon compound further comprises the step of controlling said hydrogen and fluorine in said amorphous hydrogenated fluorocarbon compound in an atomic ratio of about one part hydrogen to about nine parts fluorine or higher.

9. The method of claim 7, further including the step of treating said optically transparent film with a particle beam.

10. The method of claim 7, further comprising introducing said hydrogen and said fluorine into a vacuum container by an inert carrier gas, wherein the step of exposing the substrate to the atmosphere containing said hydrogen and said fluorine is performed in the vacuum container.

11. The method of claim 10, wherein said introducing said hydrogen and said fluorine into the vacuum container by said inert carrier gas comprises supplying said inert carrier gas, said hydrogen, and said fluorine into the vacuum container at flow rate ratios so as to form a predetermined pressure in the vacuum container.

12. The method of claim 7, wherein the step of forming said optically transparent film on said substrate is accomplished by magnetron sputtering.

13. The method of claim 7, further comprising:
   holding the substrate by a holding means; and
   rotating or translating the holding means during the step of exposing said substrate to an atmosphere containing hydrogen and fluorine in order that the optically transparent film be uniformly deposited on the substrate.

14. A method of manufacturing an optically transparent film, the method comprising the steps of:
   providing a substrate;
   exposing said substrate to an atmosphere containing carbon to form said optically transparent film having an intergrated transmittance on said substrate;
   exposing said substrate to an atmosphere containing hydrogen and fluorine to include fluorine in said optically transparent film to the extent that the content of fluorine in said optically transparent film controls said intergrated transmittance of said optically film within the visible region, wherein said exposing said substrated to said atmosphere containing hydrogen and fluoring further comprises the step of forming said optically transparent film including an amorphous hydrogenated fluorocarbon compound on said substrate; and
   depositing a liquid crystal layer on said optically transparent film.

15. The method or claim 14, wherein said depositing said liquid crystal layer further includes treating said liquid crystal layer with a particle beam.

16. A panel comprising:
   a first substrate having an external surface;
   a first optically transparent film including an amorphous fluorocarbon compound positioned on said external surface of said first substrate; and
   a liquid crystal layer positioned on said first optically transparent film, wherein said amorphous fluorocarbon compound comprises an amorphous hydrogenated fluorocarbon compound.

17. The panel of claim 16, further including a second optically transparent film positioned on said liquid crystal layer and a second substrate positioned on said second optically transparent film.

18. The panel of claim 17, wherein said panel is a display device.

19. The panel of claim 16, wherein said first optically transparent film has an integrated transmittance in the visible region of about 50% or higher.

20. The panel of claim 19, wherein said first optically transparent film has a film thickness of about 100 nm.

21. The panel of claim 16, wherein said amorphous hydrogenated fluorocarbon compound includes hydrogen and fluorine in an atomic ratio of about one part hydrogen to about nine parts fluorine or higher.

22. The panel of claim 16, wherein said first optically transparent film has a relative dielectric constant in the range of about 2 to about 5.

23. The panel of claim 16, wherein said liquid crystal layer is a particle beam aligned liquid crystal layer.

* * * * *